Patented Nov. 18, 1924.

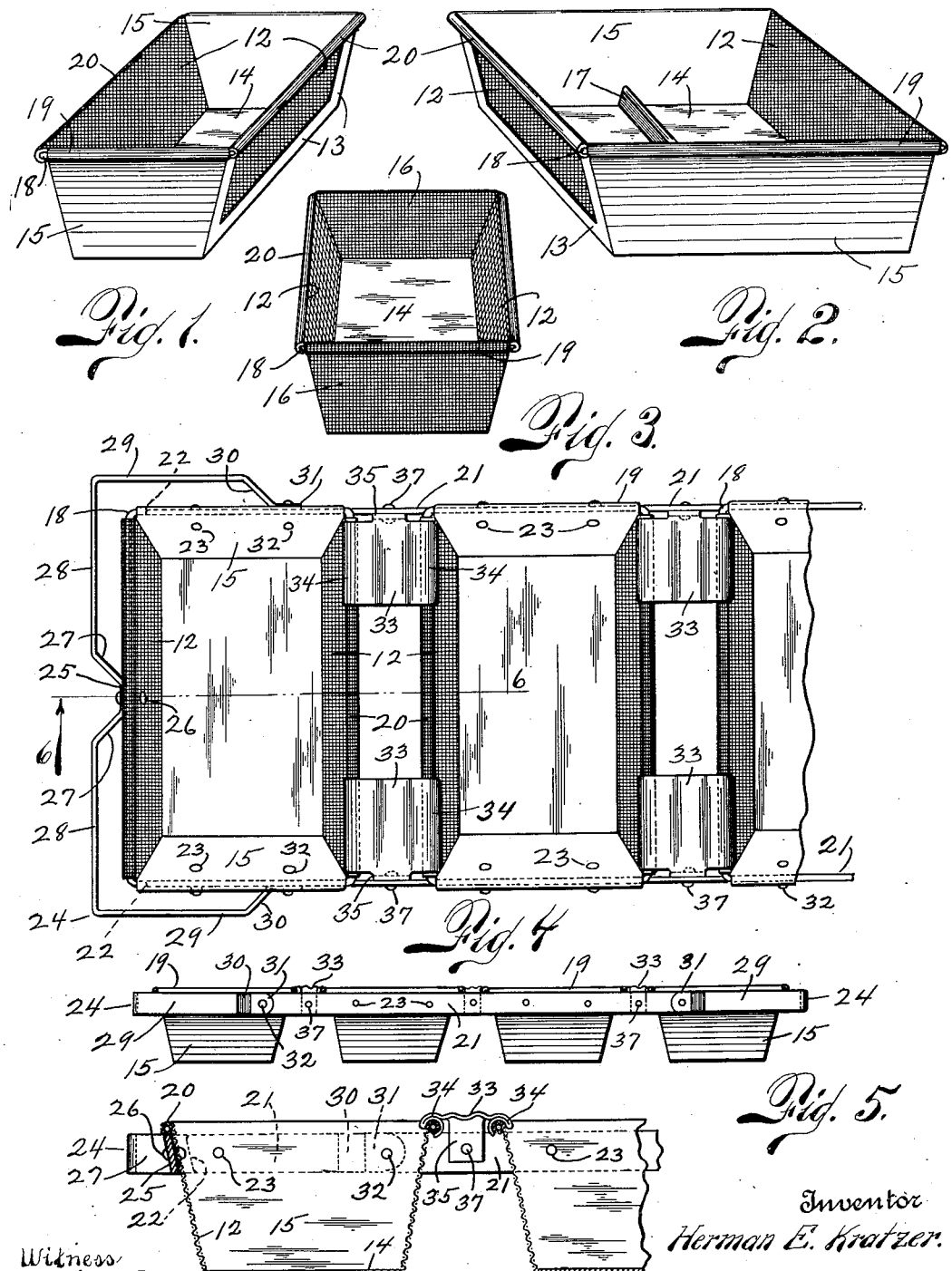

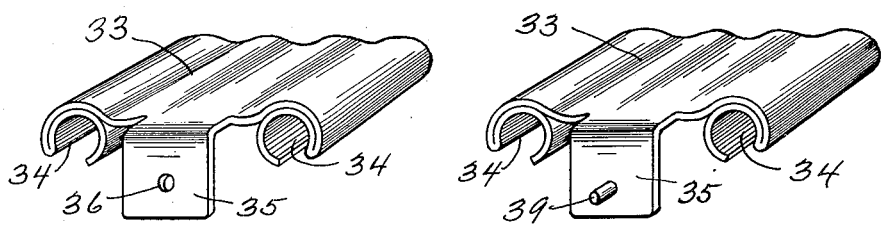
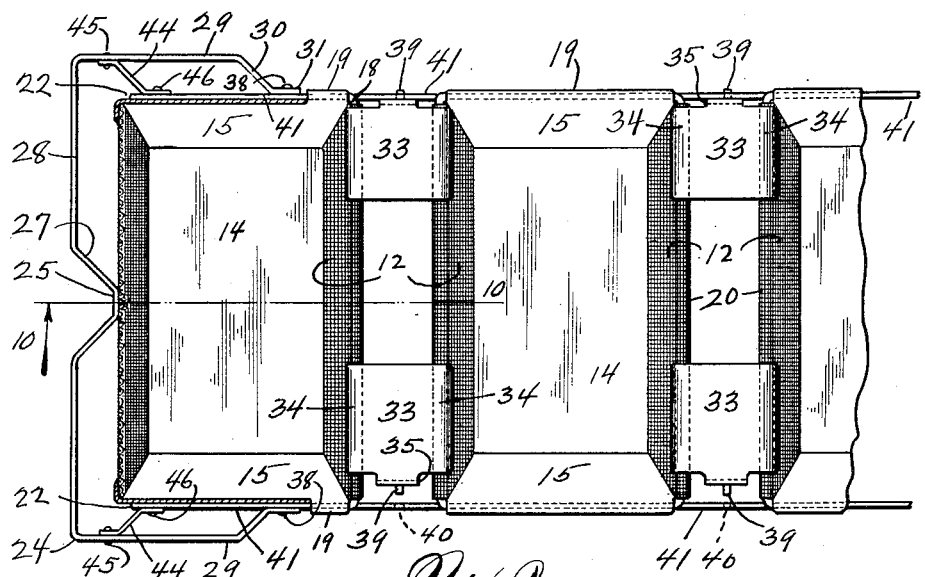
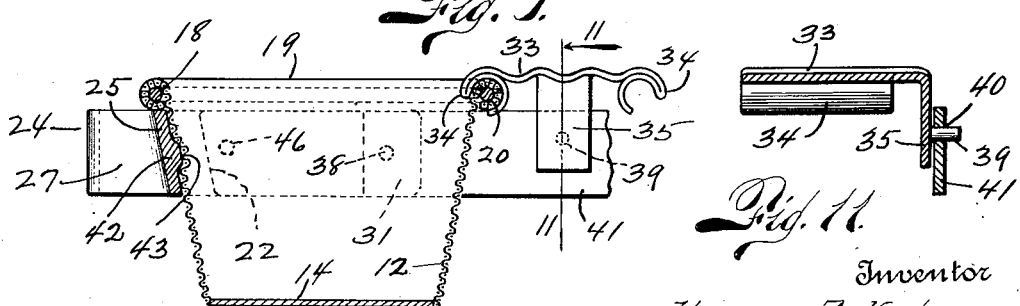

1,516,232

UNITED STATES PATENT OFFICE.

HERMAN E. KRATZER, OF SALT LAKE CITY, UTAH.

BREAD-BAKING PAN AND CONNECTING AND HANDLING MEANS FOR A PLURAL ASSEMBLY THEREOF.

Application filed July 28, 1923. Serial No. 654,383.   REISSUED

*To all whom it may concern:*

Be it known that I, HERMAN E. KRATZER, a citizen of the United States, and a resident of Salt Lake City, in the county of Salt Lake and State of Utah, have invented certain new and useful Improvements in Bread-Baking Pans and Connecting and Handling Means for a Plural Assembly Thereof, of which the following is a specification.

This invention relates to the art of baking, and the especial improvements reside in novelly constructed and functioning bread baking pans and connecting and handling means for a plural assembly thereof, which said baking pans have been more particularly designed for the baking of loaf bread that is adapted to be sanitarily wrapped for the market.

Under the more sanitary present day methods of marketing bread, either in single or plural loaf form, the same is desirably wrapped within waxed paper, or otherwise, which wrapper may further be actually sealed or not as preferred.

As a matter of fact, however, even though off-hand it may seem to be of minor importance and appearingly obvious of attainment, considerable difficulty has heretofore been experienced, prior to my invention, in so suitably baking the loaves as to prevent the grain and texture thereof from breaking, or the wall surfaces crumbling off, when wrapping, shipping or otherwise handling the same, and to retain their normally contained moisture for a substantial length of time, without moldy deterioration when kept or stored in close containers for instance, thus guarding against the bread becoming either soggy or moldy tasting or rapidly dried out and stale. Also, in many instances even a wrapped load, with weakly crusted or non-crusted side wall surfaces, will have become streaky or soiled in appearance, from handling or otherwise, before being delivered to the customer or consumer, and all of which foregoing features are not only very unsightly and undesirable but are also otherwise objectionable in the desired attainment of well-preserved, substantially air-tight and moisture-proof cleanly appearing, neatly and sanitarily wrapped loaves.

One of the primary objects of my invention, therefore, for obtaining the most satisfactory results, has been to devise simple, durable and effective means for causing the bread itself, whether as a single or double loaf, to become so formed in the baking thereof as to provide an encompassing protective wall coating, or an integral edible envelope container as it were, that is crusted of substantially the same browned consistency as the fully exposed top surface thereof, whereby there is provided reinforced protection for the grain and texture of the loaf against breaking when wrapping, shipping or otherwise handling the same, as well as for keeping the bread freshly moist while free from moldiness, and all of this in addition to the more pleasing resultant appearance of the all-crusty browned loaf.

Another important object of the improvements, both as to efficiency and economy in baking as well as in the more facile handling of a battery of the pans as a unit, resides in the manner of the plural spaced assembly of the pans and the means for connecting, supporting and handling the same as a unit, whether connected and supported as a permanently fixed structure or as a knock-down arrangement, whereby the baking heat is caused to attack the dough with substantially the same intensity all around, thereby not only insuring a more evenly baked loaf in a relatively shorter time but also being thus more economical both as to the conservation of heat as well as of time and labor, and all of which foregoing features are important factors in bread baking with economy and perfected results.

The foregoing as well as other objects and advantages of the improvements, however, will be so clearly apparent it is believed, as incidental to the following disclosure, that it would serve no useful purpose to further enlarge upon the same initially, and with these prefacing remarks, therefore, reference will now be immediately had to the accompanying drawings, illustrating certain practical embodiments of the improvements, in which drawings—

Figure 1 is a perspective view one of the improved single loaf bread baking pans;

Figure 2 is a substantially similar view but of a double loaf baking pan;

Figure 3 is a view substantially analogous to Figure 1, although obviously the structure shown may be employed with a double loaf pan as well, but in which the end walls of the pan are made of screen analogously to the side walls thereof;

Figure 4 is a partially broken-away top plan view of a permanently fixed plural assembly of single loaf pans of the type shown at Figure 1, but obviously this would apply to the structures of Figures 2 and 3 as well, with spacing, connecting, supporting and handling means for the battery thereof;

Figure 5 is an elevational view of said battery assembly of Figure 4, on a smaller scale, looking towards the ends of the pans;

Figure 6 is a longitudinal sectional view along the line 6—6 of Figure 4;

Figure 7 is a perspective detail view of one of a set of pan spacing and interlocking cleats or springy clips employed;

Figure 8 is a view analogous to Figure 7 but showing an altered minor detail thereof;

Figure 9 is a fragmentary top plan view, analogous to Figure 4, but of a knock-down assembly arrangement, with a part of the upper portion of the left hand end pan shown in section, and with the complementary pairs of spacing cleat elements shown respectively in fully locked and withdrawn positions;

Figure 10 is a longitudinal sectional view along the line 10—10 of Figure 9; and Figure 11 is a detail cross-sectional view along the line 11—11 of Figure 10.

While obviously it is not requisite to unnecessarily multiply the views of the drawings by specifically illustrating in plural assembly the pan structures of Figures 2 and 3, still of course it is to be understood that the illustrations embraced in Figures 4 to 11 are intended to likewise apply to an assembly of the pan structures of Figures 2 and 3, or any other equivalent forms.

The numeral 12 designates the longitudinal or side walls of the pans, which walls in all instances are always formed of metallic mesh screen, as distinguished from a foraminate structure in the sense of a freely perforated otherwise solid wall, which latter will not function in the accomplishment of the ends desired.

These walls are preferably built up from say #16 mesh black steel mining screen, and they provide freely exposed open-mesh surfaces that are unencompassed or uncovered and substantially unobstructive to the direct penetration or passage of heat therethrough, although these screen walls may if desired be reinforced along their bottom and end edges by marginal strips, as at 13, which strips might be marginal flanges of the metal bottom 14 and the transverse or end walls 15.

The bottom 14 and the end walls 15 are preferably imperforate, and this is particularly true of the bottom to allow for proper greasing, if for nothing else, although in so far as the essence of my invention is concerned the end walls could be freely perforated, or even formed of fine screen, if found to be expedient or desirable for any reason. In this connection the pan structure of Figure 3 is shown as having its end walls 16 of screen analogously to the side walls 12.

In the double loaf pan of Figure 2, the only difference over either of the single loaf pans of Figures 1 and 3 is that the double loaf pan is naturally made larger, and provides a central longitudinally disposed upstanding plate or base division strip 17.

In the ordinary general structures, the upper edge portions of the pans are provided with a binding or retaining band or wire 18 that encompasses the same, with the upper edge portions of the transverse and longitudinal walls turned thereover as crimped rims 19 and 20, and as well understood.

Referring first to the permanently fixed assembly of Figures 4 to 6, the numeral 21 designates a pair of spacing bars for supporting or connecting the pans in coupled approximately equidistant spaced relation. These bars are longitudinally disposed relatively to the series of pans as a unit, extending along the end walls thereof and terminating at each end at positions, as at 22, slightly short of the outer side walls 12 of the end pans of the series. They are securely attached to the end walls 15 of each pan, as by rivets 23 or equivalent means. It is to be observed, however, that these bars 21 do not extend around the screen side walls 12, but terminate approximately at the positions 22 as before stated, and this is important because otherwise they would obstruct the free passage of direct heat to that upper side of the baking bread, thereby leaving an untoasted or streak-like marginal band as it were therealong. It is to be further particularly observed that not only are the remotely disposed screen side walls 12 of the end pans thus adapted to be freely exposed in open-mesh communication with the oven space, but also that the interiors of the pans themselves will be in open-mesh communication with each other, serially, directly through the oven space between the adjacent screen sides and without any intervening heat barrier walls. The baking bread itself, therefore, will be the only substantial barrier to heat by way of said side walls, the side walls of the baking bread acting as reverberative heat absorbing surfaces, so that the storage baking heat will directly and uniformly attack the same, without loss by radiation and with much economy, in point of conserving heat and time in the actual baking operations, as well as attaining the highly desired end of causing the side walls of the bread to be formed as a toast-like protective crusty coating. The spaced side walls 12 of adjacent pans are also connected to the bars 21, but indirectly so through cleat elements hereinafter referred to.

A combined handle and end spacing member, for each end pan of the series of pans as a unit, is generally indicated by the numeral 24. As specifically illustrated, although other equivalent means might be employed, each of said members preferably comprises a bar of strap iron that has a central depressed portion 25, secured as at 26 to the outer side wall 12 of its complementary end pan, with outwardly divergent short offsetting arms 27 merging into oppositely directed sections 28 which provide continuing inwardly directed sections 29, bent at right angles to the sections 28, the said sections 29 terminating in inwardly bent short offsetting arms 30, having fastening ears 31 which are secured both to their complementary spacing support bars 21 and the end walls 15 of the end pans, as by means of rivets 32 or their equivalent.

It will be seen, therefore, that the sections 28—29 are in the nature of corner encompassing angle-bars which, however, are rigidly maintained spaced from the side and end walls of the end pans, by the pairs of short offsetting arms 27—30, and they dually function both as handle means, for the series of pans as a unit, and as endwise and lateral spacing means for several such units in the oven, both relatively to each other and the walls of the oven. This latter is of no mean importance, as it permits of the even distribution of the baking heat all around each pan, with each pan itself in its unit being substantially spaced from the next adjacent pan, as has heretofore been referred to and which will now be more specifically described.

The several pans of a unit are held spaced apart, approximately equidistant, mainly by means of the supporting or connecting bars 21 secured to the end walls 15 thereof by the rivets 23, but I also provide further spacing and anchoring elements between upper edge portions of adjacent side walls 12 of the pans, which additionally connect the said upper edge portions of the pans indirectly to the bars 21, and thereby serve as bracing or trussing means, as it were, for more rigidly mounting and supporting the pans against any tendency towards central sagging or warping.

To this end I provide cleats or clip members, see Figure 7 as to details, preferably comprising a corrugated top plate 33, of fairly resilient or stiff springy metal, the longitudinal edge portions of which are bent over upon themselves to form longitudinal grooveways or clip arms 34 for encompassing, in resiliently gripping relation, the end portions of the rims 20 of the adjacently disposed side walls 12 of the complementary paired pans of the series. One of these cleats is disposed at each end of the adjacent pans, straddling or spanning the spacing gap therebetween, and each at its outer end is provided with a downwardly projected lug or tongue 35 that is apertured at 36 for fastening, as by a rivet 37, to the inside face of its complementary pan-coupling bar or tie-band 21, the latter having a series of appropriately spaced apertures for this purpose. It is obvious, however, that the aperture 36 may be substituted for by a pin, as indicated at 39 of Figure 8, adapted to serve as an integral rivet element, and it is likewise obvious that the plate 33 does not essentially have to be corrugated, nor that it nor its clip arms 34 need necessarily be springy, although it may be preferable that they all be so.

In the knock-down structure of Figures 9–11, while the main principles are generally the same as heretofore described, the tie or pan-coupling bars are indicated at 41, and in this arrangement they additionally function as detachably connecting or supporting bars, terminating preferably at substantially the positions 22, as mentioned with reference to the bars 21, slightly short of the outer side walls of the end pans. The object of having these bars so terminate in both arrangements, instead of extending around the outer side walls of the end pans, is to leave the said walls wholly unobstructed thereby and thus not be a hindrance to the direct passage of the baking heat, at those positions, to the contents of the end pans.

The bars 41 are shown as provided with appropriately spaced apertures 40 for the reception of the pins 39 of the cleats 33 of Figure 8, but obviously these apertures 40 may be substituted for by pins cooperating with apertures 36 of the forms of cleats of Figure 7.

Also, in this knock-down arrangement, the combined handle and end-spacing members 24 are substantially the same as heretofore, excepting that in this case the inset arm portion 25 thereof provides a lug, teat or pin 42 cooperating with a depression, socket or aperture 43 formed in or mounted by the outer side wall 12 of each end pan, for a snap-in attachment therebetween. Obviously, however, the elements 42—43 may be reversely mounted in transposed relation, and as a matter of fact such elements 42—43, if so desired, could additionally be supplied with reference to the tie-bars 41 and the end walls 15 of the pans.

In this modified arrangement, the combined handle and end-spacing members 24 are not fastened to the end pans, nor are the tie bars 41 directly secured to any of the pans by rivets or otherwise, but the tie bars 41 and the members 24 are fixedly connected together, as an integrally removable whole relatively to the pans and fastening means therebetween, by means of the rivets 38 and the additional short strut arms 44, with the riveting means 45—46 therefor, the rivets 38 and 46 supplying fastening means to the bars 41 only. Of course these specific details of attachment may be provided for by equivalent means.

In assembling the arrangement of Figures 7-11 it will be apparent that, with the adjacent side walls 12 of the complementary pans coupled together by the cleats 33 in their withdrawn positions, as shown at one side of Figure 9, the frame-like main-support, embodying the elements 41 and 24, may readily be snapped into interlocked relation with the outer side walls 12 of the end pans, through the means 42—43 or their equivalent, the bars 41 then being disposed in association with the underside surfaces of the end rims 19 of the pans, whereupon the cleats 33 may be slid outwardly, as shown at the opposite side of Figure 9, into interlocked relation with the bars 41, through the means 39—40 or their equivalent.

Thus there is provided a knock-down structure that is substantially as rigid, in final assembly, as in the permanently fixed arrangement of Figures 3-6, and which has some certain features of advantage relatively to storing facilities and the replacement of the pans in a unit, for instance, although otherwise both structures function substantially in the same manner, with reference to handling, spacing and baking features, in which latter two relations they most effectively permit the baking heat to be evenly distributed around all sides of each pan, including the end pans as well as the intermediate ones, thereby causing the heat to attack both the side walls and end walls of all pans, and hence the contents of the pans, with the same intensity from all sides, and which has not been feasible in baking operations as heretofore practiced.

From the foregoing description, it is believed that the full objects, advantages and functioning of the improvements will be clearly apparent, but, while there has thus been disclosed certain preferred embodiments thereof, it may later be found to be expedient or desirable to make some alterations in the structural form and arrangement of elements, although without departing from the gist or the spirit of the invention.

It is to be understood, therefore, that the invention is not to be restricted to all of the details exactly as illustrated and described, excepting as they may come within the terms of the claims, or equivalent elements and combinations or arrangements thereof, or as when fairly interpreted in the light of the specification if necessary.

What I do claim, as new and patentable, is:—

1. The combination with a plurality of baking pans, each comprising a bottom, end walls and side walls, of means for connecting same in series as an assembled battery unit and with the adjacent side walls of complementary pans maintained spaced apart, and combined end spacing and handling means for each end of said battery unit, each of which embodies corner encompassing angle bars extending from the outer side wall of an end pan to the end walls thereof.

2. The combination with a plurality of baking pans, each comprising a bottom, end walls and side walls, of means for connecting same as an assembled battery unit and with the adjacent side walls of complementary pans maintained spaced apart, which said means embodies a pair of supporting bars, seating along the end walls of said pans, and paired spacing cleat members disposed in interlocking relation between the said spaced side walls and a complementary one of said supporting bars, and outwardly projected combined spacing and handling means extending from the end walls and the outer side wall of each end pan of the series.

3. The combination with a plurality of baking pans, each comprising a bottom, end walls and side walls, of means for connecting same as an assembled battery unit and with the adjacent side walls of complementary pans maintained spaced apart, which said means embodies a pair of supporting bars, seating along the end walls of said pans, with paired spacing cleat members disposed in interlocking relation between the said spaced side walls and a complementary one of said supporting bars, and combined end spacing and handling means for each end of said battery unit, each of said latter means embodies corner encompassing angle bars extending in spaced relation from the outer side wall of an end pan to the end walls thereof.

4. The combination with a plurality of baking pans, each embodying a bottom, end walls and side walls, the said side walls being formed of freely exposed unencompassed open-mesh screen, of means for connecting said pans sidewise, as an assembled battery unit, with the adjacent side walls so spaced apart, with no substantial heat barrier therebetween, as to cause the interiors of said pans to be in open-mesh communication, serially, directly through the unobstructed oven space between said adjacent side walls, and combined end spacing and handling means for said unit, embodying corner encompassing angle bars extending around the corners of said unit in rigidly supported spaced relation thereto.

5. The combination with a plurality of baking pans, each comprising a bottom, end walls and side walls, the said side walls being formed of wire mesh screen, of means for connecting the said pans as an assembled battery unit and with adjacent screen side walls of complementary pans maintained spaced apart, which said means embodies a pair of supporting bars, seating along the end walls of said pans, with paired spacing cleat members disposed in interlocking relation between the said spaced screen side walls and a complementary one of said supporting bars, and combined end spacing and handing means for each end of said battery unit, each of which said latter means embodies corner encompassing angle bars extending in spaced relation from the outer screen side wall of an end pan to the end walls thereof.

In testimony whereof, I affix my signature.

HERMAN E. KRATZER.